(12) United States Patent
Moon et al.

(10) Patent No.: US 9,762,068 B2
(45) Date of Patent: Sep. 12, 2017

(54) WIRELESS POWER TRANSFER SYSTEM

(71) Applicant: FAIRCHILD KOREA SEMICONDUCTOR LTD, Bucheon-si (KR)

(72) Inventors: SangCheol Moon, Daejeon (KR); Gwanbon Koo, Bucheon-si (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 458 days.

(21) Appl. No.: 14/494,112

(22) Filed: Sep. 23, 2014

(65) Prior Publication Data

US 2015/0084427 A1 Mar. 26, 2015

Related U.S. Application Data

(60) Provisional application No. 61/882,681, filed on Sep. 26, 2013.

(30) Foreign Application Priority Data

Sep. 3, 2014 (KR) .................. 10-2014-0117091

(51) Int. Cl.
*H02J 5/00* (2016.01)
*H01F 38/14* (2006.01)

(52) U.S. Cl.
CPC ............. *H02J 5/005* (2013.01); *H01F 38/14* (2013.01)

(58) Field of Classification Search
CPC .................................. H02J 5/005; H01F 38/14
USPC ........................................................... 307/104
See application file for complete search history.

(56) References Cited

U.S. PATENT DOCUMENTS

| 8,400,248 B2 | 3/2013 | Kim et al. | |
|---|---|---|---|
| 2010/0231340 A1* | 9/2010 | Fiorello | H01F 38/14 336/92 |
| 2012/0139358 A1* | 6/2012 | Teggatz | H01F 38/14 307/104 |
| 2012/0223586 A1 | 9/2012 | Gotani | |
| 2012/0248890 A1 | 10/2012 | Fukushima | |
| 2013/0015719 A1 | 1/2013 | Jung et al. | |
| 2013/0082537 A1 | 4/2013 | Kim et al. | |
| 2013/0099729 A1 | 4/2013 | Yoon et al. | |

* cited by examiner

*Primary Examiner* — Joseph Chang (57) ABSTRACT

A wireless power transmission system according to an exemplary embodiment of the present invention includes: a source coil at a primary side; a load coil at a secondary side; and at least two intermediate coils coupled with each other in an insulated manner with a predetermined turn ratio with respect to the source coil. An effective inductance of the source coil is increased by the at least two intermediate coils and thus a coupling coefficient between the source coil and the load coil is increased.

16 Claims, 7 Drawing Sheets

WIRELESS POWER TRANSFER SYSTEM

CROSS-REFERENCE TO RELATED APPLICATION

This application claims priority to and the benefit of U.S. Patent Application No. 61/882,681 filed in the USPTO on Sep. 26, 2013, and priority to and the benefit of Korean Patent Application No. 10-2014-0117091, filed with the Korean Intellectual Property Office on Sep. 3, 2014, the entire contents of which are incorporated herein by reference.

BACKGROUND OF THE INVENTION (a) Field of the Invention

An exemplary embodiment relates to a wireless power transmission system.

(b) Description of the Related Art

An electric vehicle may be supplied with power using a wired charging method and a wireless charging method. According to the wireless charging method, an AC electromagnetic field is generated at a primary side (i.e., charger) using an induction coil and a second conduction coil at a secondary side (i.e., electric vehicle) receives power from the AC electromagnetic field generated in the primary side such that a battery of the electric vehicle is charged.

A multi-coil resonator is used to increase efficiency in the wireless charging method. For example, an intermediate coil is added to each of the primary side and the secondary side such that the multi-coil resonator can be formed of four coils. In detail, a source coil and a transmission coil, which is an intermediate coil, may be provided in the primary side and a receiving coil, which is an intermediate coil, and a load coil may be provided in the secondary side. The coils at the primary side and the coils at the secondary side may be symmetrical to each other.

However, the receiving coil, which is the intermediate coil at the secondary side, cannot affect the primary side because the primary side and the secondary side are far from each other. Then, in terms of the primary side, the multi-coil resonator implemented by the four coils operates similar to a multi-coil resonator in which a transmission coil is added only to the primary side and thus implemented by three coils.

In addition, many resistance components are contained in the primary side in wireless power transmission and accordingly a main power loss mostly occurs at the primary side.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a wireless power transmission system that can enhance power transmission efficiency.

A wireless power transmission system according to an exemplary embodiment of the present invention includes: a source coil at a primary side; a load coil at a secondary side; and at least two intermediate coils coupled with each other in an insulated manner with a predetermined turn ratio with respect to the source coil. An effective inductance of the source coil is increased by the at least two intermediate coils and thus a coupling coefficient between the source coil and the load coil is increased.

The at least two intermediate coils may be provided inside of the source coil. One of the at least two intermediate coils may be provided inside of the other intermediate coil. Alternatively, one of the at least two intermediate coils may be provided in parallel with the other intermediate coil.

The wireless power transmission system further includes at least two first resonance capacitors coupled to each of the at least two intermediate coils.

The wireless power transmission system further includes a circuitry for converting an input voltage to a square wave at the primary side, and an operational frequency of the square wave conversion means may be set to a frequency that is lower than a resonance frequency of one of the at least two intermediate coils.

The resonance frequency may be inversely proportional to the square root of a value of multiplying a leakage inductance of one of the at least two intermediate coils by a capacitance of a first resonance capacitor connected to the one intermediate coil.

The leakage inductance of each of the at least two intermediate coils reflected to the primary side may be coupled to a leakage inductance and a magnetizing inductance of the source coil, and a value of the leakage inductance of each of the at least two intermediate coils reflected to the primary side may be determined by multiplying the leakage inductance of each of the at least two intermediate coils by the square of a turn ratio between the source coil and each of the at least two intermediate coils.

A capacitance of each of the at least two first resonance capacitors reflected to the primary side may be coupled in series to the leakage inductance of each of the at least two intermediate coils reflected to the primary side, and a value of the capacitance of each of the at least two first resonance capacitors reflected to the primary side may be determined by dividing the capacitance of each of the at least two first resonance capacitors by the square of a turn ratio between the source coil and each of the at least two intermediate coils.

Each of the at least two intermediate coils may be reflected to the primary side, and an effective inductance of the source coil may be boosted at least two times by an impedance of the at least two intermediate coils reflected to the primary side.

A boosting effect of the effective inductance of the source coil may be generated from a resonance frequency that is based on each of the at least two intermediate coils and each of the at least two first resonance capacitors.

The wireless power transmission system may further include a second resonance capacitor coupled to the source coil.

The wireless power transmission system further include a circuitry for supplying a square wave between the second resonance capacitor and the source coil by converting an input voltage.

The wireless power transmission system further includes a third resonance capacitor coupled to the load coil.

The wireless power transmission system further includes a rectification circuit coupled to the third resonance capacitor and the load coil.

The wireless power transmission system that can enhance power transmission efficiency can be provided.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Figure 1:
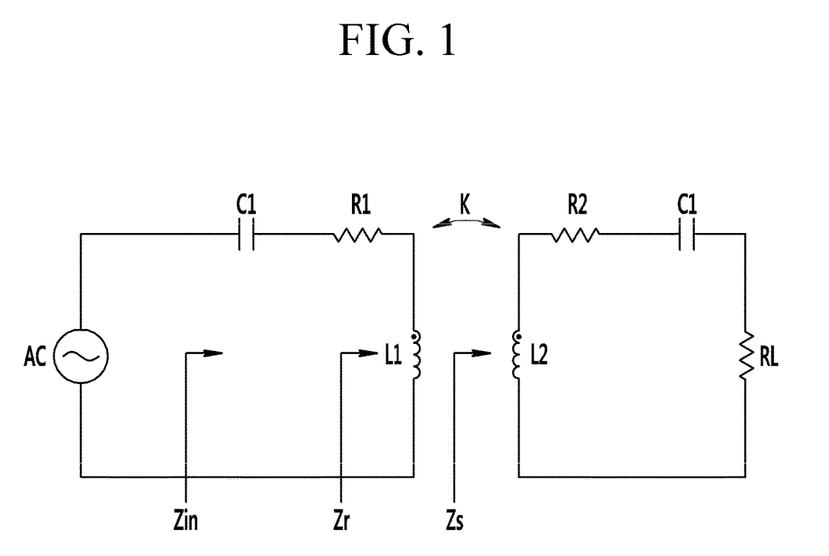
FIG. 1 shows an equivalent circuit of a simplified 2-coil resonator system.

Power transmission efficiency may be calculated with consideration of winding resistance and a coupling coefficient. FIG. 1 shows an equivalent circuit of a 2-coil resonator system.

In the equivalent circuit of FIG. 1, power transmission efficiency $\eta$ may be given as in Equation 1.

$$\eta = \frac{Re(Z_r)}{Re(Z_{in})} \cdot \frac{R_L}{Re(Z_s)} \qquad \text{[Equation 1]}$$

$$= \frac{1}{1 + \frac{R_1}{(R_2 + R_L)k^2 L_1 L_2} \left( \frac{(R_2 + R_L)^2}{\omega^2} + L_2^2 - \frac{2L_2}{\omega^2 C_2} + \frac{1}{\omega^4 C_2^2} \right)} \cdot \frac{R_L}{R_2 + R_L}$$

In FIG. 1, Zin denotes input impedance, Zr denotes reflective impedance generated from an influence of a load coil at the secondary side to the primary side, and Zs denotes secondary side impedance. k denotes a coupling coefficient between the primary side and the secondary side. R1 and R2 respectively denote wire resistance of the primary coil and wire resistance of the secondary coil, and RL denotes load resistance. L1 and L2 respectively denote inductance of the primary coil and inductance of the secondary coil, and C1 and C2 respectively denote primary side capacitance and secondary side capacitance. In Equation 1, a frequency that makes a phase of Zin zero is considered for high efficiency. That is, $\omega$ is set as a resonance frequency $\omega_0$ as given in Equation 2.

$$\omega = \omega_0 = 1/\sqrt{L_1 C_1} = 1/\sqrt{L_2 C_2} \qquad \text{[Equation 2]}$$

Equation 3 is derived from substation of Equation 2 to Equation 1.

$$\eta = \frac{1}{1 + \frac{R_1(R_2 + R_L)}{k^2 \omega_0^2 L_1 L_2}} \cdot \frac{R_L}{R_2 + R_L} \qquad \text{[Equation 3]}$$

As in Equation 3, the power transmission efficiency $\eta$ is proportional to the coupling coefficient k and is inversely proportional to coil resistance R1 and R2. Thus, the power transmission efficiency of the wireless power transmission system can be enhanced as the coupling coefficient k is increased and as the wire resistance R1 and R2 are decreased.

In order provide higher power transmission efficiency than the 2-coil resonator, the exemplary embodiment includes a multi-coil resonator. A relationship between the power transmission efficiency, the coupling coefficient, and the wire resistance, summarized in Equation 3 is equally applied to the exemplary embodiment. That is, the power transmission efficiency can be enhanced by increasing the coupling coefficient and reducing the wire resistance.

In the exemplary embodiment, a multi-coil resonator of which a coupling coefficient is increased is provided. In addition, a multi-coil resonator of which the number of turns is reduced for acquiring the same inductance may be provided. Then the number of turns is reduced, the wire resistance can be reduced.

In the multi-coil resonator according to the exemplary embodiment, the primary side and the secondary side are asymmetrically implemented. For example, at least two transmission coils, which are intermediate coils are located together with the source oil in the primary side and one load coil is located in the secondary side.

The source coil and the at least two transmission coils in the primary side may be located in a manner of acquiring the maximum booting effect. The boosting effect implies an increase of inductance of the source coil.

Hereinafter, an exemplary embodiment of the present invention will be described with reference to the accompanying drawings.

Figure 2:
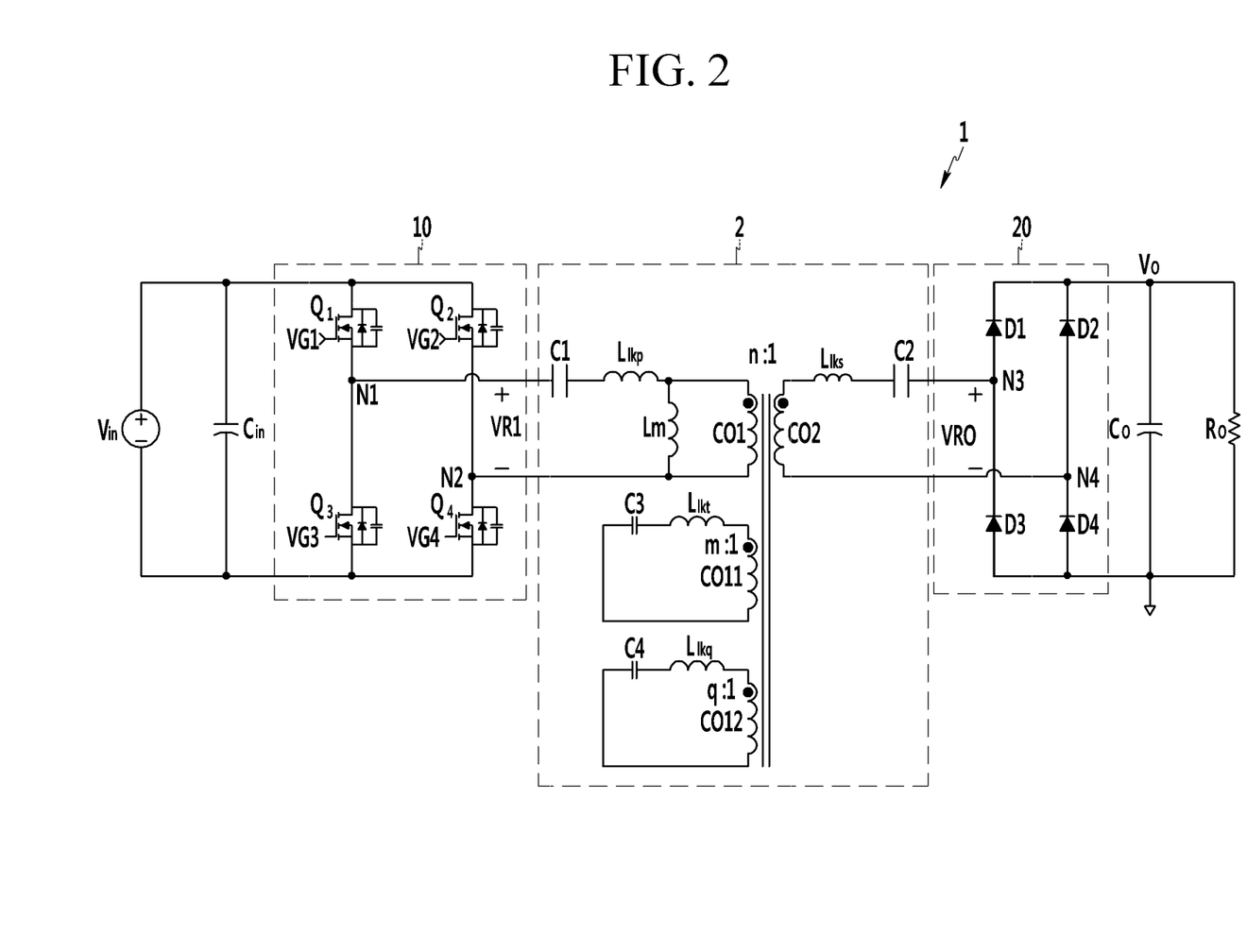
FIG. 2 shows a wireless power transmission system according to an exemplary embodiment of the present invention.

FIG. 2 shows a wireless power transmission system according to an exemplary embodiment of the present invention.

As shown in FIG. 2, a wireless power transmission system 1 includes a multi-coil resonator 2. The multi-coil resonator 2 includes a source coil CO1, a first intermediate coil CO11, and a second intermediate coil CO12 at the primary side and one load coil CO2 at the secondary side.

The first intermediate coil CO11 and the second intermediate coil CO12 are respectively coupled in an insulated manner with a predetermined turn ratio with respect to the source coil CO1.

FIG. 2 illustrates two intermediate coils CO11 and CO12 for convenience of description, and the number of intermediate coils is not limited to two.

The first intermediate coil CO11 and the second intermediate coil CO12 boost inductance of the source coil CO1 at the primary side. Thus, in order to acquire the same inductance, the number of turns of the source coil CO1 may be reduced or equivalent resistance of the source coil CO1 may be reduced.

In addition, the boosting effect of the inductance of the source coil CO1 is generated twice by the first and second intermediate coils CO1 and CO2 such that the coupling coefficient is increased. For example, the first and second intermediate coils CO11 and CO12 may be designed to maximize the boosting effect in an allowable range of the multi-coil resonator 2 around a switching frequency. Since a circulating current at the primary side that does not contribute energy transmission to a load can be reduced as the coupling coefficient is increased, an effective value of an input current can be reduced.

In FIG. 2, the wireless power transmission system 1 is implemented as a full-bridge inverter, but the present invention is not limited thereto, and for example it may be implemented as a half-bridge inverter.

An input voltage Vin may be generated by rectifying an AC input. A capacitor Cin may smoothen the input voltage Vin. The full-bridge inverter 10 is an example of a means for conversion of an input voltage Vin into a square wave. The full-bridge inverter 10 includes four switches Q1 to Q4, and the input voltage Vin is converted to the square wave according to switching operations of the four switches Q1 to Q4. Hereinafter, a switching frequency of the means for conversion of the input voltage Vin to the square wave is referred to as an operation frequency.

Four gate voltages VG1 to VG4 are respectively input to gates of the four switches Q1 to Q4. The switches Q1 to Q4 are turned on by enable-level (i.e., high-level) gate voltages VG1 to VG4 and turned off by disable-level (i.e., low-level) gate voltages VG1 to VG4.

The switch Q1 is connected between the input voltage Vin and a node N1, and the switch Q2 is connected between the input voltage Vin and a node N2. The switch Q3 is connected between the node N1 and a primary ground, and the switch Q4 is connected between the node N2 and the primary ground.

When the switch Q1 and the switch Q4 are turned on and the switch Q2 and the switch Q3 are turned off, a square-wave voltage VRI is an input voltage Vin. When the switch Q2 and the switch Q3 are turned on and the switch Q1 and the switch Q4 are turned off, the square-wave voltage VRI is −Vin voltage, which is an opposite polarity of the input voltage Vin.

The resonance capacitor C1 is connected between the source coil CO1 and the node N1. The square-wave voltage VRI may be converted into a sine wave due to a resonance between a leakage inductance Llkp and a magnetizing inductance Lm of the source coil CO1 and the resonance capacitor C1.

The first intermediate coil CO11 is connected between lateral ends of the resonance capacitor C3, and a resonance may be generated between a leakage inductance Llkt of the first intermediate coil CO11 and the resonance capacitor C3. A turn ratio between the number of turns of the source coil CO1 and the number of turns of the first intermediate coil CO11 is m:1 (the number of turns of CO1:the number of turns of CO11).

The second intermediate coil CO12 is connected between later ends of the resonance capacitor C4, and a resonance may be generated between a leakage inductance Llkg of the second intermediate coil CO12 and the resonance capacitor C4. A turn ratio between the number of turns of the source coil CO1 and the number of turns of the second intermediate coil CO12 is q:1 (the number of turns of CO1:the number of turns of CO12).

Figure 3:
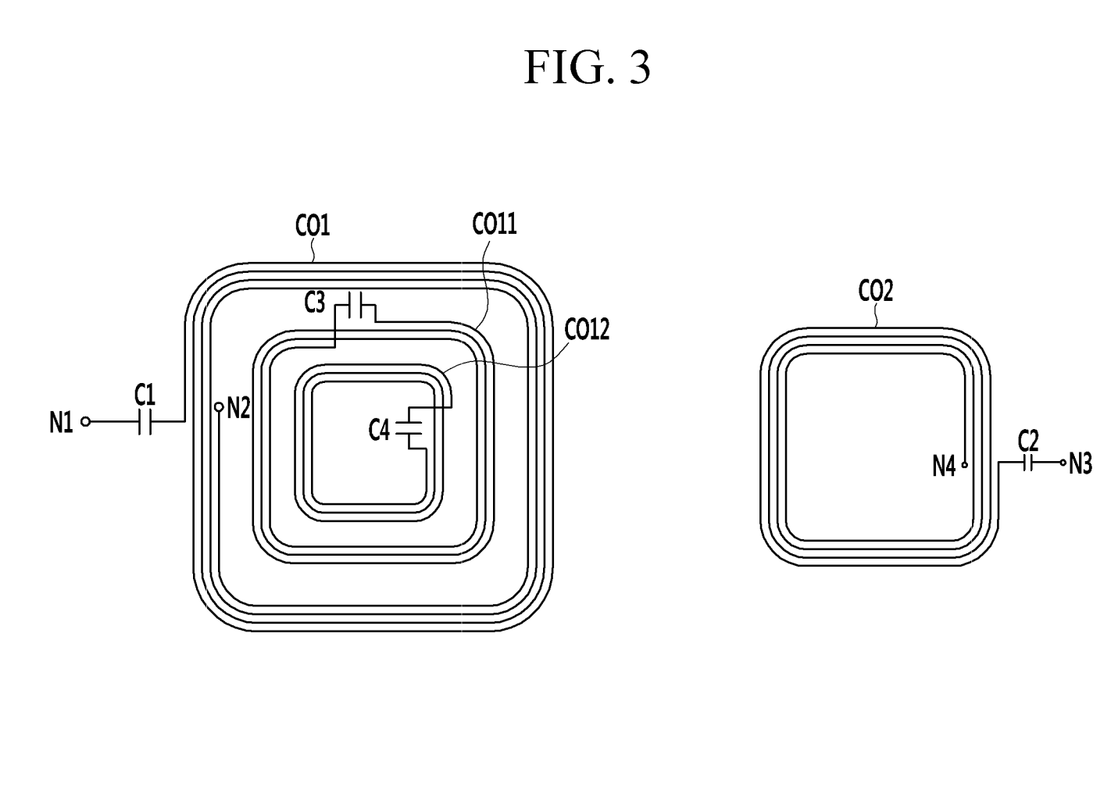
FIG. 3 shows an example of a primary wire and a secondary coil according to the exemplary embodiment of the present invention.

FIG. 3 illustrates examples of the primary coil and the secondary coil according to the exemplary embodiment.

As shown in FIG. 3, the first intermediate coil CO11 may be located in an inner side of the source coil CO1 and the second intermediate coil CO12 may be located in an inner side of the first intermediate coil CO11.

Figure 4:
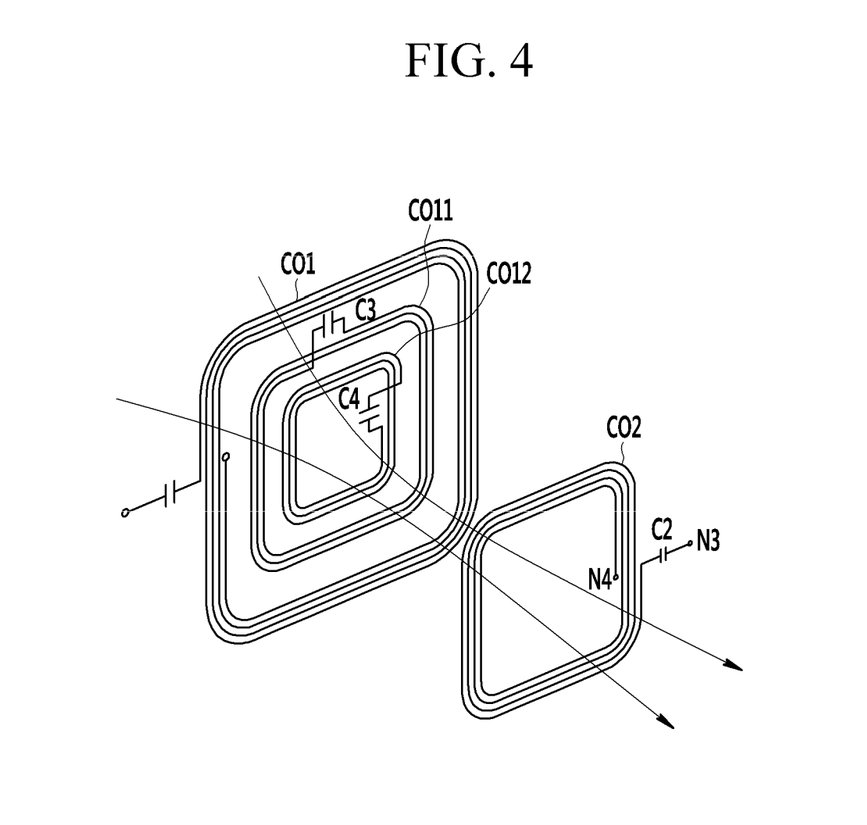
FIG. 4 shows an alignment of the primary coil and the secondary coil of FIG. 3.

FIG. 4 shows an alignment of the primary and secondary coils of FIG. 3.

As shown in FIG. 4, the load coil CO2 and the coils CO1, CO11, and CO12 at the primary side are disposed facing each other.

Figure 5:
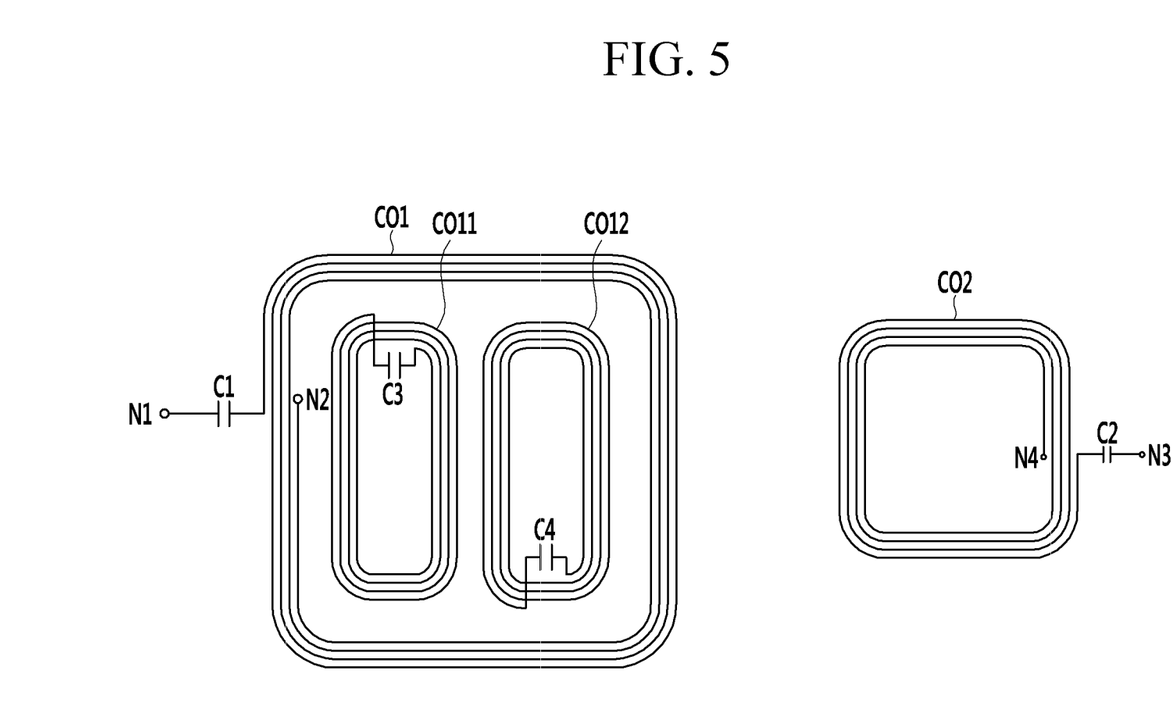
FIG. 5 shows another example of the primary coil and the secondary coil according to the exemplary embodiment of the present invention.

FIG. 5 shows another example of the primary and secondary coils according to the exemplary embodiment.

As shown in FIG. 5, the first intermediate coil CO11 and the second intermediate coil CO12 may be disposed in parallel with each other in an inner side of the source coil CO1. As in FIG. 3, the load coil CO2 and the coils CO1, CO11, and CO12 at the primary side are disposed facing each other.

In FIG. 3 and FIG. 5, the source coil CO1 at the primary side is connected between the node N1 and the node N2, and the load coil CO2 at the secondary side is connected between the node N3 and the node N4. Lateral ends of the first intermediate coil CO11 are connected to lateral ends of the capacitor C3, and lateral ends of the second intermediate coil CO12 are connected to lateral ends of the capacitor C4.

The multi-coil resonator 2 includes the load coil CO2 and the resonance capacitor C2 located at the secondary side. A rectification circuit 20 and a capacitor Co are connected to the secondary side, and a load connected to the wireless power transmission system 1 is denoted as a resistor Ro.

A turn ratio between the number of turns of the source coil CO1 and the number of turns of the load coil CO2 is n:1 (the number of turns of CO1:the number of turns of CO2). A voltage VR0 between the node N3 and the node N4 may be generated as a sine wave due to a resonance between a leakage inductance Llks of the load coil CO2 and the resonance capacitor C2.

The rectification circuit 20 is a full-wave rectification circuit including four diodes D1 to D4. A cathode of the diode D1 is connected to an output voltage Vo and an anode of the diode D1 is connected to the node N3. A cathode of the diode D2 is connected to the output voltage Vo and an anode of the diode D2 is connected to the node N4. A cathode of the diode D3 is connected to the node N3 and an anode of the diode D3 is connected to a secondary ground. A cathode of the diode D4 is connected to the node N4 and an anode of the diode D4 is connected to the secondary ground.

A capacitor Co attenuates a ripple of the output voltage Vo. The capacitor Co may be charged by a current supplied through the rectification circuit 20, or a current may be discharged to the load Ro from the capacitor Co.

An effective self-inductance and a magnetizing inductance of the source coil CO1 are boosted around a resonance frequency of each of the first intermediate coil CO11 and the second intermediate coil CO12, and this is referred to as a double-boosting effect. For example, a resonance frequency $\omega_t$ of the first intermediate coil CO11 and a resonance frequency $\omega_q$ of the second intermediate coil CO12 are as given in Equation 4 and Equation 5.

$$\omega_t = \frac{1}{\sqrt{C_3 \left( L_{lkt} + \frac{L_m}{m^2} \right)}}$$ [Equation 4]

$$\omega_q = \frac{1}{\sqrt{C_4 \left( L_{lkq} + \frac{L_m}{q^2} \right)}}$$ [Equation 5]

When C3 and C4 denote capacitances of the resonance capacitors C3 and C4, Llkt and Llkq denote leakage inductances of the first intermediate coil CO11 and the second intermediate coil CO12, Lm denotes a magnetizing inductance of the source coil CO1, m denotes a turn ratio of the source coil CO1 and the first intermediate coil CO11, and q is a turn ratio of the source coil CO1 and the second intermediate coil CO12.

The first and second intermediate coils CO11 and CO12 induce an increase of an effective inductance of the source coil CO1, and induces an increase of an apparent coupling coefficient between the source coil CO1 and the load coil CO2. Then, the power transmission efficiency is increased.

Figure 6:
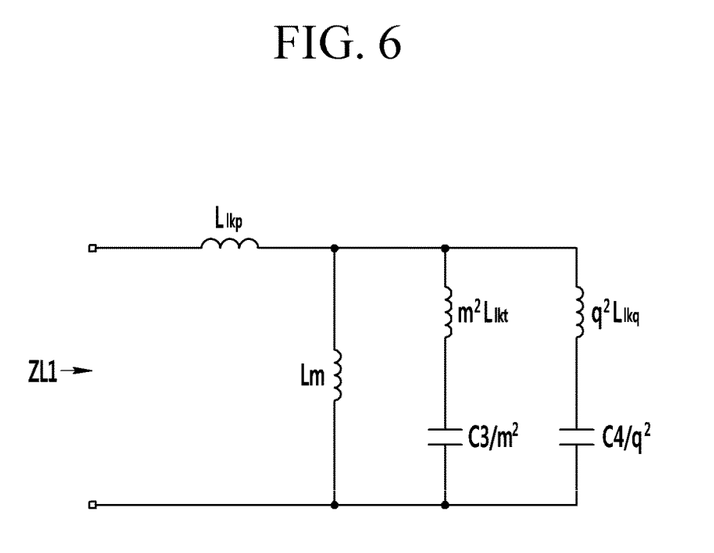
FIG. 6 shows an equivalent circuit of an effective inductance of a source coil.

For example, when the load coil CO2 shown in FIG. 2 is an open circuit, an equivalent circuit with respect to the effective inductance of the source coil CO1 is as shown in FIG. 6.

FIG. 6 shows an equivalent circuit illustrating an effective inductance of the source coil.

In FIG. 6, the effective inductance of the source coil CO1 is denoted as ZL1.

In the equivalent circuit, an impedance of the first intermediate coil CO11 reflected to the primary side, that is, a leakage inductance and a resonance capacitor are connected in series and values are respectively $m^2 L_{lkt}$ and $C_3/m^2$. The leakage inductance of the first intermediate coil CO11 is connected to the leakage inductance Llkp and the magnetizing inductance Lm of the source coil CO1.

In the equivalent circuit, a leakage inductance and a resonance capacitor of the second intermediate coil CO12 reflected to the primary side are connected in series and values are respectively $q^2 L_{lkq}$ and $C_4/q^2$. The leakage inductance of the second intermediate coil CO12 is connected to the leakage inductance Llkp and the magnetizing inductance Lm of the source coil CO1.

Since the two intermediate coils CO11 and CO12 are reflected to the primary side, the effective inductance ZL1 of the source coil CO1 may have the entire impedance having a phase angle of 90 degrees. This can be represented as given in Equation 6.

$$Z_{L1} = \left| sL_{lkp} + \frac{sL_m(s^2 L_{lkt} C_3 + 1)(s^2 L_{lkq} C_4 + 1)}{\left( s^2(m^2 L_{lkt} + L_m)\frac{C_3}{m^2} + 1 \right)(s^2 L_{lkq} C_4 + 1) + (s^2 L_{lkt} C_3 + 1)s^2 L_m \frac{C_4}{q^2}} \right|$$ [Equation 6]

s denotes a Laplace variable, Llkp denotes a leakage inductance of the source coil, and other variables are the same as those described in Equation 4 and Equation 5.

If the leakage inductance Llkg and the capacitor C4 are an open circuit in a condition that the number of intermediate coils is one, Equation 6 can be represented as given in Equation 7.

$$Z_L = \left| sL_{lkp} + \frac{sL_m(s^2 L_{lkt} C_3 + 1)}{\left( s^2(m^2 L_{lkt} + L_m)\frac{C_3}{m^2} + 1 \right)} \right|$$ [Equation 7]

ZL denotes an effective inductance in a condition that the number of intermediates is one, that is, in a condition that a single-boosting effect is generated.

When the operation frequency fs is designed as given in Equation 8, a denominator in Equation 6 is decreased as much as $s^2 L_m C_4/q^2$.

$$f_s < 1/(2\pi\sqrt{L_{lkt} C_3})$$ [Equation 8]

Then, the effective inductance ZL1 in the condition of the double-boosting effect has a higher value than the effective inductance ZL in the single-boosting condition.

Figure 7:
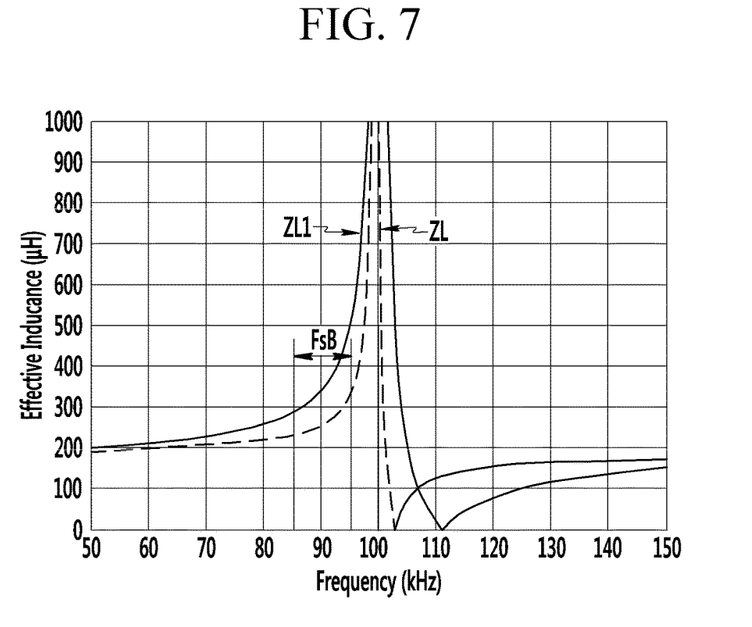
FIG. 7 is a graph illustrating a relationship between an effective inductance and a frequency of a single-boosting effect and a relationship between an effective inductance and a frequency of a double-boosting effect.

FIG. 7 is a graph illustrating a relationship between an effective inductance according to the single-boosting effect and a frequency and a relationship between an effective inductance according to the double-boosting effect and a frequency.

In FIG. 7, the effective inductance ZL1 is marked by the solid line and the effective inductance ZL is marked by the dotted line.

As shown in FIG. 7, in an operation frequency band (e.g., 85 Khz-95 Khz, FsB), the effective inductance ZL has a lower value than the effective inductance ZL1 but rapidly increases and the effective inductance ZL1 is relatively smoothly increased and has a higher value than the effective inductance ZL. This is because that the boosting effect occurs two times around a resonance frequency of each of the two intermediate coils. The operation frequency band FsB may be set around a resonance frequency that corresponds to Equation 4 and Equation 5.

Accordingly, a coupling coefficient according to the double-boosting effect is higher than a coupling coefficient according to the single-boosting effect, and thus power transmission efficiency is increased.

In the wireless power transmission system having the single-boosting effect, the effective inductance is rapidly increased in the operation frequency band. Then, the effective inductance is rapidly varied according a frequency deviation of a control IC and accordingly, the power transmission system becomes unstable and an output voltage may experience severe fluctuation.

However, the multi-coil resonator according to the exemplary embodiment provides an effective inductance having a higher value according to a smoother slope compared to single-boosting so that stability in power transmission can be enhanced and fluctuation of the output voltage can be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

1: wireless power transmission system
2: multi-coil resonator
10; full-bridge inverter
20: rectification circuit
CO1: source coil CO2: load coil
CO11: first intermediate coil
CO12: second intermediate coil

What is claimed is:

1. A wireless power transmission system comprising:
a source coil at a primary side;
a load coil at a secondary side; and
at least two intermediate coils that are not wired together and are coupled with each other in an insulated manner, the at least two intermediate coils having a predetermined turn ratio with respect to the source coil, wherein an effective inductance of the source coil is increased by the two intermediate coils, and thus, a coupling coefficient between the source coil and the load coil is increased.

2. The wireless power transmission system of claim 1, wherein the at least two intermediate coils are provided completely inside of the source coil.

3. The wireless power transmission system of claim 2, wherein one of the at least two intermediate coils is provided inside of the other intermediate coil.

4. The wireless power transmission system of claim 2, wherein one of the at least two intermediate coils is provided in parallel with the other intermediate coil.

5. The wireless power transmission system of claim 1, further comprising at least two first resonance capacitors coupled to each of the at least two intermediate coils.

6. The wireless power transmission system of claim 5, further comprising a circuitry for converting an input voltage to a square wave at the primary side, wherein an operation frequency of the converting the input voltage to the square wave is set to a frequency that is lower than a resonance frequency of one of the at least two intermediate coils.

7. The wireless power transmission system of claim 6, wherein the resonance frequency is inversely proportional to a square root of a value that results from multiplying a leakage inductance of one of the at least two intermediate coils by a capacitance of a first resonance capacitor coupled to the one intermediate coil.

8. The wireless power transmission system of claim 5, wherein a leakage inductance of each of the at least two intermediate coils reflected to the primary side is coupled to a leakage inductance and a magnetizing inductance of the source coil, and
wherein a value of the leakage inductance of each of the at least two intermediate coils reflected to the primary side is determined by multiplying the leakage inductance of each of the at least two intermediate coils by a square of a turn ratio between the source coil and each of the at least two intermediate coils.

9. The wireless power transmission system of claim 5, wherein a capacitance of each of the at least two first resonance capacitors reflected to the primary side is coupled in series to a leakage inductance of each of the at least two intermediate coils reflected to the primary side, and a value of the capacitance of each of the at least two first resonance capacitors reflected to the primary side is determined by dividing the capacitance of each of the at least two first resonance capacitors by a square of a turn ratio between the source coil and each of the at least two intermediate coils.

10. The wireless power transmission system of claim 1, wherein each of the at least two intermediate coils is reflected to the primary side, and an effective inductance of the source coil is boosted at least two times by an impedance of the at least two intermediate coils reflected to the primary side.

11. The wireless power transmission system of claim 10, further comprising at least two first resonance capacitors coupled to each of the at least two intermediate coils.

12. The wireless power transmission system of claim 11, wherein a boosting effect of the effective inductance of the source coil is generated from a resonance frequency that is based on each of the at least two intermediate coils and each of the at least two first resonance capacitors.

13. The wireless power transmission system of claim 12, further comprising a second resonance capacitor coupled to the source coil.

14. The wireless power transmission system of claim 13, further comprising a circuitry for supplying a square wave between the second resonance capacitor and the source coil by converting an input voltage.

15. The wireless power transmission system of claim 13, further comprising a third resonance capacitor coupled to the load coil.

16. The wireless power transmission system of claim 15, further comprising a rectification circuit coupled to the third resonance capacitor and the load coil.

* * * * *